(12) United States Patent
Kobayashi et al.

(10) Patent No.: US 12,081,088 B2
(45) Date of Patent: Sep. 3, 2024

(54) AXIAL-GAP-DYNAMOELECTRIC MACHINE

(71) Applicant: YAMAHA HATSUDOKI KABUSHIKI KAISHA, Iwata (JP)

(72) Inventors: Takayuki Kobayashi, Shizuoka (JP); Hirotaka Kurita, Shizuoka (JP); Tatsuya Hagiwara, Shizuoka (JP); Takumi Sugimura, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 275 days.

(21) Appl. No.: 17/859,412

(22) Filed: Jul. 7, 2022

(65) Prior Publication Data

US 2022/0352777 A1    Nov. 3, 2022

Related U.S. Application Data

(63) Continuation-in-part of application No. PCT/JP2020/047363, filed on Dec. 18, 2020.
(Continued)

(51) Int. Cl.
| | |
|---|---|
| *H02K 1/2793* | (2022.01) |
| *H02K 1/16* | (2006.01) |
| *H02K 1/2713* | (2022.01) |
| *H02K 3/12* | (2006.01) |
| *H02K 3/34* | (2006.01) |

(Continued)

(52) U.S. Cl.
CPC .............. *H02K 29/03* (2013.01); *H02K 1/16* (2013.01); *H02K 1/2713* (2013.01); *H02K 1/2793* (2013.01); *H02K 3/12* (2013.01); *H02K 3/34* (2013.01); *H02K 21/24* (2013.01)

(58) Field of Classification Search
CPC .. H02K 1/16; H02K 3/12; H02K 3/34; H02K 1/2793
See application file for complete search history.

(56) References Cited

U.S. PATENT DOCUMENTS

| 9,071,118 B2 | 6/2015 | Takemoto |
| 10,340,753 B2 * | 7/2019 | Rhyu ........................ H02K 1/12 |

(Continued)

FOREIGN PATENT DOCUMENTS

| DE | 10311819 A1 * | 10/2004 | ............. H02K 21/24 |
| DE | 10311819 A1 | 10/2004 | |

(Continued)

*Primary Examiner* — Robert W Horn
(74) *Attorney, Agent, or Firm* — Rabin & Berdo, P.C.

(57) ABSTRACT

An axial-gap-dynamoelectric machine includes resin bobbins having positioning protrusions, and a stator core including a base yoke having a plurality of tooth holes and positioning holes. In each tooth hole, a circumferential length of a tooth-hole-radial-direction-outer-end surface is larger than a circumferential length of a tooth-hole-radial-direction-inner-end surface. Each of the plurality of teeth has a columnar shape in which a circumferential length of a tooth-upper surface is larger than a circumferential length of a tooth-bottom surface. The positioning protrusions are inserted in the positioning holes, and press the teeth against the base yoke inward in the radial direction such that the tooth-bottom surface is brought into contact with the tooth-hole-radial-direction-inner-end surface and the tooth-oblique surface is brought into contact with the tooth-hole-circumferential-direction-end surface.

6 Claims, 12 Drawing Sheets

Related U.S. Application Data

(60) Provisional application No. 62/961,130, filed on Jan. 14, 2020.

(51) Int. Cl.
*H02K 21/24* (2006.01)
*H02K 29/03* (2006.01)

(56) References Cited

U.S. PATENT DOCUMENTS

| | | |
|---|---|---|
| 2011/0316381 A1 | 12/2011 | Asano |
| 2013/0187488 A1 | 7/2013 | Sakamoto et al. |
| 2013/0221788 A1 | 8/2013 | Yokota |
| 2014/0035422 A1 | 2/2014 | Mikami et al. |
| 2014/0252904 A1 | 9/2014 | Mikami et al. |
| 2014/0368077 A1 | 12/2014 | Yokota et al. |
| 2015/0091405 A1 | 4/2015 | Sakamoto et al. |
| 2015/0214797 A1 | 7/2015 | Sakamoto et al. |
| 2016/0268866 A1 | 9/2016 | Matsumoto |
| 2019/0013708 A1 | 1/2019 | Hattori et al. |
| 2021/0384778 A1 | 12/2021 | Saito et al. |
| 2022/0263393 A1 | 8/2022 | Takahashi |
| 2022/0278575 A1 | 9/2022 | Otsuka |
| 2022/0329115 A1 | 10/2022 | Saito et al. |
| 2022/0345018 A1* | 10/2022 | Kobayashi .............. H02K 1/16 |
| 2023/0046567 A1 | 2/2023 | Matsushita et al. |
| 2023/0163646 A1 | 5/2023 | Asano et al. |
| 2023/0187984 A1 | 6/2023 | Asari et al. |

FOREIGN PATENT DOCUMENTS

| | | | |
|---|---|---|---|
| EP | 1450464 A1 | 8/2004 | |
| EP | 1460746 A1 | 9/2004 | |
| EP | 1536542 A1 | 6/2005 | |
| EP | 1746704 A2 | 1/2007 | |
| EP | 3131188 A1 | 2/2017 | |
| JP | S57-202866 A | 12/1982 | |
| JP | 2006-333579 A | 12/2006 | |
| JP | 2009-033946 A | 2/2009 | |
| JP | 2010-088142 A | 4/2010 | |
| JP | 5040407 B2 | 10/2012 | |
| JP | 6210006 B2 * | 10/2017 | |
| WO | WO-03047069 A1 * | 6/2003 | ............. H02K 1/148 |
| WO | 2004/017489 A1 | 2/2004 | |
| WO | 2007/114079 A1 | 10/2007 | |
| WO | 2009/057674 A1 | 5/2009 | |
| WO | WO-2015114794 A1 * | 8/2015 | ............. H02K 1/148 |
| WO | 2015/162708 A1 | 10/2015 | |
| WO | 2019/077983 A1 | 4/2019 | |

* cited by examiner

AXIAL-GAP-DYNAMOELECTRIC MACHINE

CROSS-REFERENCE TO RELATED APPLICATIONS

This is a continuation-in-part application of International Application PCT/JP2020/047363, filed on Dec. 18, 2020, which claims priority from U.S. Provisional Application No. 62/961,130, filed on Jan. 14, 2020. The contents of the applications are incorporated herein by reference.

TECHNICAL FIELD

The present teaching relates to an axial-gap-dynamoelectric machine.

BACKGROUND ART

In a known axial-gap-dynamoelectric machine, a rotor including a plurality of magnets and rotatable about a rotation axis and a stator including a stator core and a stator coil are located in an axial direction of the rotation axis. A known example of such an axial-gap-dynamoelectric machine is an axial gap motor (hereinafter referred to as an axial-gap-dynamoelectric machine) disclosed in Patent Document 1.

In this axial-gap-dynamoelectric machine, a rotor includes an annular rotor yoke attached to a shaft and a plurality of permanent magnets disposed on a surface of the rotor yoke near a stator. The rotor is located in an axial direction of a rotation axis of the rotor with respect to the stator.

A stator core of the stator includes an annular base yoke disposed so as to be substantially orthogonal to the shaft and pressed powder iron core teeth provided on a surface of the base yoke near the rotor. The plurality of teeth extends along the shaft and are arranged around the shaft. A coil is wound around each of the teeth about the axis. The teeth are fixed to the base yoke by press fitting or bonding, for example.

As illustrated in, for example, FIG. 1 of Patent Document 1, each of the teeth has a triangular shape.

CITATION LIST

Patent Document

Patent Document 1: International Patent Publication No. 2007/114079

SUMMARY OF INVENTION

Technical Problem

It has been required for an axial-gap-dynamoelectric machine having a configuration as described above to have an enhanced magnetic flux density and an efficient flow of magnetic fluxes from the viewpoint of miniaturization, for example. In such a case of enhancing the magnetic flux density of the axial-gap-dynamoelectric machine, it is preferable to increase the space factor of coils wound around the teeth. As disclosed in Patent Document 1, when the teeth are seen along the axial direction, in a case where the shape of each of the teeth is a triangle whose width in a circumferential direction gradually decreases toward the inside of the stator in the radial direction, the inside in the radial direction of a gap between adjacent ones of the teeth is larger in the circumferential direction than the inside in the radial direction of a gap between adjacent ones of the teeth in a case of each of the teeth having a rectangular shape. Accordingly, in the stator, the space factor of the coils wound around the teeth can be increased. Since the pressed powder iron core teeth, each of which can be formed in any shape, have the shape described above, the magnetic flux density of the axial-gap-dynamoelectric machine can be increased.

In the stator, in a case where the base yoke is made of laminated steel sheets, the base yoke and the pressed powder iron core teeth are formed as different members. Accordingly, the teeth are positioned with respect to the base yoke by inserting the teeth in tooth holes formed in the base yoke.

The teeth made of pressed powder iron core are less fragile than the base yoke made of laminated steel sheets. Thus, in inserting the teeth in the tooth holes, it is necessary to carefully handle the teeth such that no shaving or the like occurs because of contact with the base yoke. This reduces assemblability of the teeth to the base yoke.

In a case where the teeth and the base yoke are formed in shapes that form a gap between the teeth and the base yoke to prevent shaving or the like from occurring in the teeth because of contact with the base yoke, the gap hinders magnetic fluxes flowing in the teeth from flowing in the circumferential direction of the base yoke and toward radially inward of the base yoke. That is, the gap hinders a flow of magnetic fluxes from the teeth to the base yoke. Accordingly, magnetic fluxes do not efficiently flow between the teeth and the base yoke. Thus, there has been a demand for an axial-gap-dynamoelectric machine that allows magnetic fluxes to flow efficiently while enhancing assemblability of the teeth to the base yoke.

It is therefore an object of the present teaching to provide an axial-gap-dynamoelectric machine that allows magnetic fluxes to flow efficiently while enhancing assemblability of the teeth to the base yoke.

Solution to Problem

Inventors of the present teaching studied a configuration of an axial-gap-dynamoelectric machine that allows magnetic fluxes to flow efficiently while enhancing assemblability of the teeth to the base yoke. Through an intensive study, the inventors of the present teaching arrived at the following configuration.

An axial-gap-dynamoelectric machine according to one embodiment of the present teaching is an axial-gap-dynamoelectric machine including: a rotor rotatable about a rotation axis, the rotor including a plurality of field magnets arranged around the rotation axis; a cylindrical stator core, aligned with the rotor in an axial direction of the stator core, such that the rotation axis of the rotor is in the axial direction, the stator core including a base yoke, and a plurality of teeth formed of pressed particles and arranged along a circumferential direction of the stator core around the base yoke; a plurality of resin bobbins, respectively for the plurality of teeth to be individually inserted therein; and a plurality of stator coils respectively wound around the plurality of resin bobbins.

Each of the plurality of resin bobbins includes a side surface, a bottom surface, and a positioning protrusion protruding from the side surface in the axial direction of the stator core. The base yoke includes a plurality of tooth holes respectively for the plurality of teeth to be individually inserted therein, and a plurality of positioning holes respectively located outward or inward of the plurality of tooth holes in a radial direction of the stator core, and configured for the plurality of positioning protrusions to be respectively inserted therein. In a view of the stator core in the axial direction, each of the plurality of tooth holes extends along the radial direction, and has a tooth-hole-radial-direction-outer-end surface located at an outer end of said each tooth hole in the radial direction, and a tooth-hole-radial-direction-inner-end surface located at an inner end of said each tooth hole in the radial direction, a circumferential length of the tooth-hole-radial-direction-outer-end surface being larger than a circumferential length of the tooth-hole-radial-direction-inner-end surface.

Each of the plurality of teeth extends along the radial direction, and has a columnar shape including a tooth-radial-direction-outer-end portion located at an outer end of said each tooth in the radial direction, and a tooth-radial-direction-inner-end portion located at an inner end of said each tooth in the radial direction, a circumferential length of the tooth-radial-direction-outer-end portion being larger than a circumferential length of the tooth-radial-direction-inner-end portion. In a state where the plurality of positioning protrusions are respectively inserted in the plurality of positioning holes, the plurality of positioning protrusions respectively press the plurality of teeth against the base yoke inward in the radial direction of the stator core, such that, for each of the plurality of teeth inserted in a corresponding one of the plurality of tooth holes, the tooth-radial-direction-inner-end portion of said each tooth is in contact with the tooth-hole-radial-direction-inner-end surface of said corresponding one tooth hole, a tooth-circumferential-direction-end portion located at an end of said each tooth in the circumferential direction of the stator core is in contact with a tooth-hole-circumferential-direction-end surface located at an end of said corresponding one tooth hole in the circumferential direction of the stator core, and the tooth-radial-direction-outer-end portion of said each tooth is not in contact with the tooth-hole-radial-direction-outer-end surface of said corresponding one tooth hole.

As described above, the teeth are formed of pressed particles that can be formed in any shapes. When seen along the axial directions, each of the teeth extends along the radial direction of the stator core and is shaped such that the circumferential length of the tooth-radial-direction-outer-end portion is larger than the circumferential length of the tooth-radial-direction-inner-end portion. A substantially rectangular space when seen along the axial direction is formed between the teeth adjacent to each other along the circumferential direction of the stator core. The stator coils wound around the teeth with the resin bobbins interposed therebetween are housed in the substantially rectangular spaces. The space factor of the stator coils to the spaces is increased by enlarging the interval between the tooth-radial-direction-inner-end portions smallest among intervals between adjacent ones of the teeth. That is, the space factor of the stator coils is more increased by setting the circumferential length of the tooth-radial-direction-inner-end portion smaller than the circumferential length of the tooth-radial-direction-outer-end portion, as compared to a case of using teeth in each of which the circumferential length of the tooth-radial-direction-inner-end portion is equal to the circumferential length of the tooth-radial-direction-outer-end portion.

When the teeth equipped with the resin bobbins are inserted in the tooth holes, the teeth are positioned in the base yoke by the positioning protrusions of the resin bobbins. At this time, the teeth are pressed against the base yoke inward along the radial direction of the stator core by the positioning protrusions. In each of the teeth, the tooth-radial-direction-inner-end portion is brought into contact with the tooth-hole-radial-direction-inner-end surface, and the tooth-circumferential-direction-end portion is brought into contact with the tooth-hole-circumferential-direction-end surface. That is, in the stator coil, even if the teeth and the base yoke are made of different members, a gap that hinders a flow of magnetic fluxes from the teeth along the circumferential direction of the base yoke is less likely to occur. Accordingly, in the axial-gap-dynamoelectric machine, a flow of magnetic fluxes from the tooth-radial-direction-inner-end portion and the tooth-circumferential-direction-end portion of each tooth to the base yoke is not easily hindered.

On the other hand, in each of the teeth, the tooth-radial-direction-outer-end portion is not in contact with the tooth-hole-radial-direction-outer-end surface. That is, in the state where the teeth are inserted in the tooth holes, a gap is present between the tooth-radial-direction-outer-end portion and the tooth-hole-radial-direction-outer-end surface, and thus, the teeth are not restrained by the tooth holes. With this shape, in inserting the teeth in the tooth holes, the teeth are brought into contact with the tooth-hole-radial-direction-inner-end surface and the tooth-hole-circumferential-direction-end surface so that a force applied on the teeth is released to the outside along the radial direction. Accordingly, in inserting the teeth in the tooth holes, a friction caused by contact with the base yoke is reduced, and the teeth are positioned by the resin bobbins with respect to the base yoke.

In addition, since the positioning protrusions are disposed outward or inward of the tooth holes in the radial direction, a flow of magnetic fluxes occurring in the base yoke between the teeth adjacent to each other along the circumferential direction of the stator core is not hindered.

Thus, it is possible to provide an axial-gap-dynamoelectric machine that allows magnetic fluxes to flow efficiently while enhancing assemblability of the teeth to the base yoke.

In another aspect, the axial-gap-dynamoelectric machine according to the present teaching preferably has the following configuration. An inner surface of each of the positioning holes forms a continuous surface with at least a part of the tooth-hole-radial-direction-outer-end surface, or with at least a part of the tooth-hole-radial-direction-inner-end surface, of one of the tooth holes corresponding thereto.

With the configuration described above, since the positioning holes are disposed outward or inward of the teeth holes in the radial direction in the base yoke, a flow of magnetic fluxes flowing from the teeth in the circumferential direction of the base yoke and having a magnetic flux density higher than that of magnetic fluxes flowing from the teeth in the radial direction of the base yoke is not hindered. The positioning holes are continuous to at least a part of the tooth-hole-radial-direction-inner-end surface or at least a part of the tooth-hole-radial-direction-outer-end surface, and thus, can be precisely formed with respect to the tooth holes. That is, the teeth are configured to be positioned easily and precisely by the resin bobbins with respect to the base yoke. Thus, it is possible to provide an axial-gap-dynamoelectric machine that allows magnetic fluxes to flow efficiently while enhancing assemblability of the teeth to the base yoke.

In another aspect, the axial-gap-dynamoelectric machine according to the present teaching preferably has the following configuration. The plurality of positioning holes is located outward of the plurality of teeth in the radial direction of the stator core.

With the configuration described above, since the positioning holes are disposed outward of the teeth holes in radial direction in the base yoke, a flow of magnetic fluxes flowing from the teeth in the circumferential direction of the base yoke and having a magnetic flux density higher than that of magnetic fluxes flowing from the teeth in the radial direction of the base yoke is not hindered. Magnetic fluxes from the teeth outward in the radial direction of the base yoke are sufficiently small relative to the entire magnetic fluxes flowing from the teeth to the base yoke. Thus, it is possible to provide an axial-gap-dynamoelectric machine that allows magnetic fluxes to flow efficiently while enhancing assemblability of the teeth to the base yoke.

In another aspect, the axial-gap-dynamoelectric machine according to the present teaching preferably has the following configuration. For each of the plurality of teeth inserted in a corresponding one of the plurality of tooth holes, an interval between the tooth-hole-radial-direction-outer-end surface of said corresponding one tooth hole and the tooth-radial-direction-outer-end portion of said each tooth is enlarged by inserting one of the positioning protrusions corresponding thereto in one of the positioning holes corresponding thereto.

With the configuration described above, the positioning protrusions enlarge intervals between the tooth-radial-direction-outer-end portions and the tooth-hole-radial-direction-outer-end surfaces and presses the teeth against the base yoke inward in the radial direction of the stator core. In the stator core, the positioning protrusions hinder a flow of magnetic fluxes from the teeth outward in the radial direction of the base yoke. However, since magnetic fluxes flowing from the teeth outward in the radial direction of the base yoke is sufficiently small relative to the entire magnetic fluxes flowing from the teeth to the base yoke, influence on the flow of magnetic fluxes can be ignored. On the other hand, in the base yoke, the positioning protrusions prevent occurrence of a gap between the base yoke and each of the tooth-radial-direction-inner-end portion and the tooth-circumferential-direction-end portion so that magnetic resistance decreases, and thus, magnetic fluxes can efficiently flow. Thus, it is possible to provide an axial-gap-dynamoelectric machine that allows magnetic fluxes to flow efficiently while enhancing assemblability of the teeth to the base yoke.

In another aspect, the axial-gap-dynamoelectric machine according to the present teaching preferably has the following configuration. The stator is molded with a resin flowing from outside to inside in the radial direction of the stator core.

With the configuration described above, the teeth inserted in the tooth holes are pressed against the tooth-hole-radial-direction-inner-end surfaces and the tooth-hole-circumferential-direction-end surfaces by a pressure caused by a flow of the resin. Thus, it is possible to provide an axial-gap-dynamoelectric machine that allows magnetic fluxes to flow efficiently while enhancing assemblability of the teeth to the base yoke.

In another aspect, the axial-gap-dynamoelectric machine according to the present teaching preferably has the following configuration. Each of the plurality of tooth has a first axial-direction-end surface and a second axial-direction-end surface located respectively at a first end and a second end of said each tooth in the axial direction of the stator core, the first end being closer to the rotor than the second end, and each of the plurality of resin bobbins covers at least a part of one of the first axial-direction-end surfaces.

With the configuration described above, movement of the teeth along the axial direction is suppressed by the resin bobbins. That is, the resin bobbins prevent detachment of the teeth inserted inside of the bobbins and maintains a uniform gap with field magnets. Thus, it is possible to provide an axial-gap-dynamoelectric machine that allows magnetic fluxes to flow efficiently while enhancing assemblability of the teeth to the base yoke.

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification, specify the presence of stated features, steps, elements, components, and/or their equivalents but do not preclude the presence or addition of one or more steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

An embodiment of an axial-gap-dynamoelectric machine according to the present teaching will be herein described.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

[Axial-Gap-dynamoelectric Machine]

An axial-gap-dynamoelectric machine herein refers to a dynamoelectric machine in which a rotor and a stator are arranged in an axial direction of a rotation axis of the rotor and the rotor rotates about the rotation axis. The rotor includes a plurality of field magnets arranged along the circumferential direction about the rotation axis. The stator includes a plurality of teeth arranged along the circumferential direction about the rotation axis. A stator coil is wound around each of the plurality of teeth. The plurality of field magnets of the rotor and the plurality of teeth of the stator are opposed to each other in the axial direction. Accordingly, the axial-gap-dynamoelectric machine has a gap in the axial direction (axial gap) between the plurality of field magnets and the plurality of teeth. The axial-gap-dynamoelectric machine includes, for example, a motor and an electric generator.

[Pressed Particles]

Pressed particles herein refer to particulates including particles of a magnetic material. Teeth, for example, are formed by pressing pressed particles.

[Tooth-Radial-Direction-Outer-End Portion]

A tooth-radial-direction-outer-end portion herein refers to a portion of a tooth extending in the radial directions of a stator core, the tooth-radial-direction-outer-end portion being located at the outer end in the radial directions of the tooth. The tooth-radial-direction-outer-end portion includes a surface of the tooth located at the outer end in the radial directions of the tooth. A circumferential length of the tooth-radial-direction-outer-end portion refers to, for example, a circumferential length of an outermost portion of the tooth-radial-direction-outer-end portion.

[Tooth-Radial-Direction-Inner-End Portion]

A tooth-radial-direction-inner-end portion herein refers to a portion of a tooth extending in the radial directions of the stator core, the tooth-radial-direction-inner-end portion being located at the inner end in the radial directions of the tooth. The tooth-radial-direction-inner-end portion includes a surface of the tooth located at the inner end of the tooth in the radial directions. A circumferential length of the tooth-radial-direction-inner-end portion refers to, for example, a circumferential length of an innermost portion of the tooth-radial-direction-inner-end portion.

[Tooth-Circumferential-Direction-End Portion]

A tooth-circumferential-direction-end portion herein refers to a portion of a tooth having a thickness in the circumferential direction of the stator core, the tooth-circumferential-direction-end portion being located at an end in the circumferential direction of the tooth. The tooth-circumferential-direction-end portion includes a surface of the tooth located at the end of the tooth in the circumferential direction. A radial length of the tooth-circumferential-direction-end portion refers to, for example, a radial length of the tooth-circumferential-direction-end portion from the tooth-radial-direction-inner-end portion to the tooth-radial-direction-outer-end portion.

[Tooth-Hole-Radial-Direction-Outer-End Surface]

A tooth-hole-radial-direction-outer-end surface herein refers to an end surface of the base yoke forming an outer end portion in the radial direction of the tooth hole extending in the radial direction of the base yoke. A circumferential length of the tooth-hole-radial-direction-outer-end surface refers to, for example, a circumferential length of the base yoke located at an outermost circumference of the outer end portion of the tooth hole in the radial direction.

[Tooth-Hole-Radial-Direction-Inner-End Surface]

A tooth-hole-radial-direction-inner-end surface herein refers to an end surface of the base yoke forming an inner end portion in the radial direction of the tooth hole extending in the radial direction of the base yoke. A circumferential length of the tooth-radial-direction-inner-end portion refers to, for example, a circumferential length of the base yoke located at an innermost circumference of the inner end portion of the tooth hole in the radial direction.

[Tooth-Hole-Circumferential-Direction-End Surface]

A tooth-hole-circumferential-direction-end surface herein refers to an end surface of the base yoke forming each end portion in the circumferential direction of the tooth hole having a width in the circumferential direction of the base yoke. A radial length of the tooth-hole-circumferential-direction-end portion refers to, for example, a radial length of each end portion of tooth hole in the circumferential direction from the tooth-hole-radial-direction-inner-end portion to the tooth-hole-radial-direction-outer-end portion.

Advantageous Effects of Invention

According to one embodiment of the present teaching, it is possible to provide an axial-gap-dynamoelectric machine that allows magnetic fluxes to flow efficiently while enhancing assemblability of the teeth to the base yoke.

DESCRIPTION OF EMBODIMENT

Figure 1:
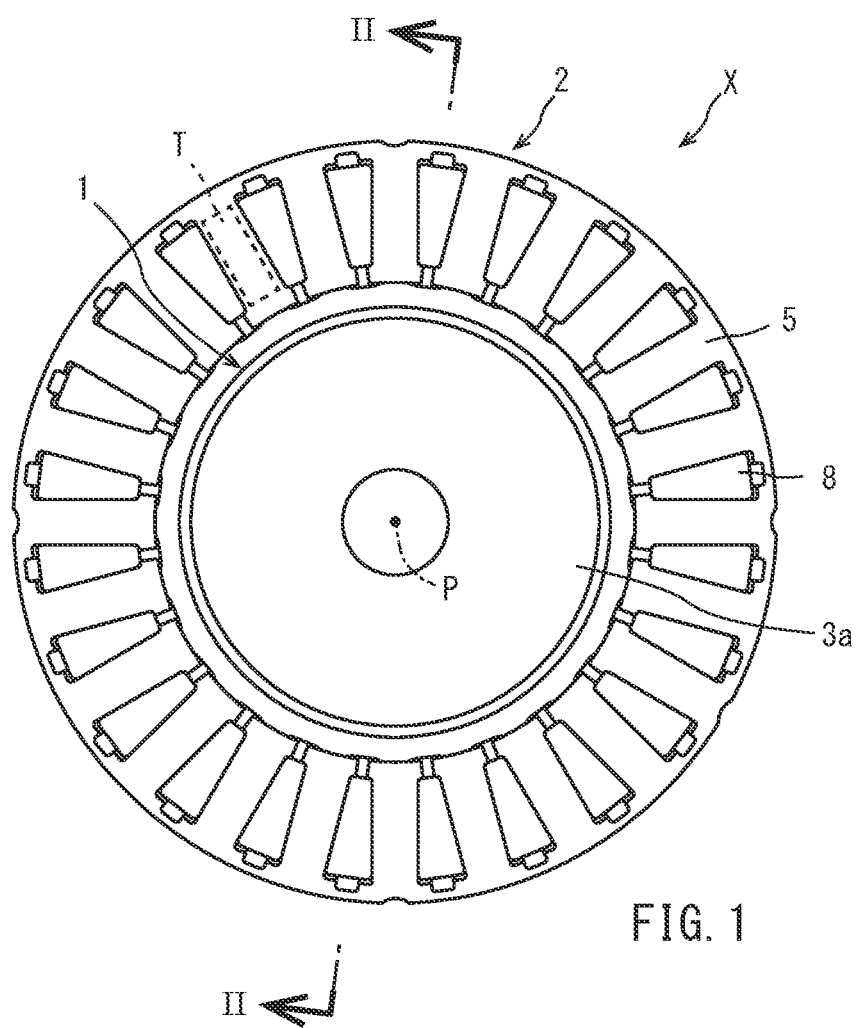
FIG. 1 is a view of an axial-gap-dynamoelectric machine according to an embodiment seen in a first direction.

An embodiment will be described hereinafter with reference to the drawings. In the drawings, the same or corresponding parts are denoted by the same reference numerals, and description thereof will not be repeated. The dimensions of components in the drawings do not strictly represent actual dimensions of the components and dimensional proportions of the components.

Directions along which a rotation axis P of an axial-gap-dynamoelectric machine X extends will be hereinafter referred to as "axial directions." Radial directions of a stator 2 of the axial-gap-dynamoelectric machine X will be hereinafter referred to as "radial directions." Directions along which a rotor 1 of the axial-gap-dynamoelectric machine X rotates about the rotation axis P will be referred to as "rotation direction" or "circumferential direction." The radial directions are directions orthogonal to the rotation axis P of the axial-gap-dynamoelectric machine X.

A direction in which the stator 2 and a rotor 1 are arranged in this order in the axial directions will be hereinafter referred to as a first direction. In the axial directions, a direction in which the rotor 1 and the stator 2 are arranged in this order will be referred to as a second direction.

<Overall Configuration>

Figure 2:
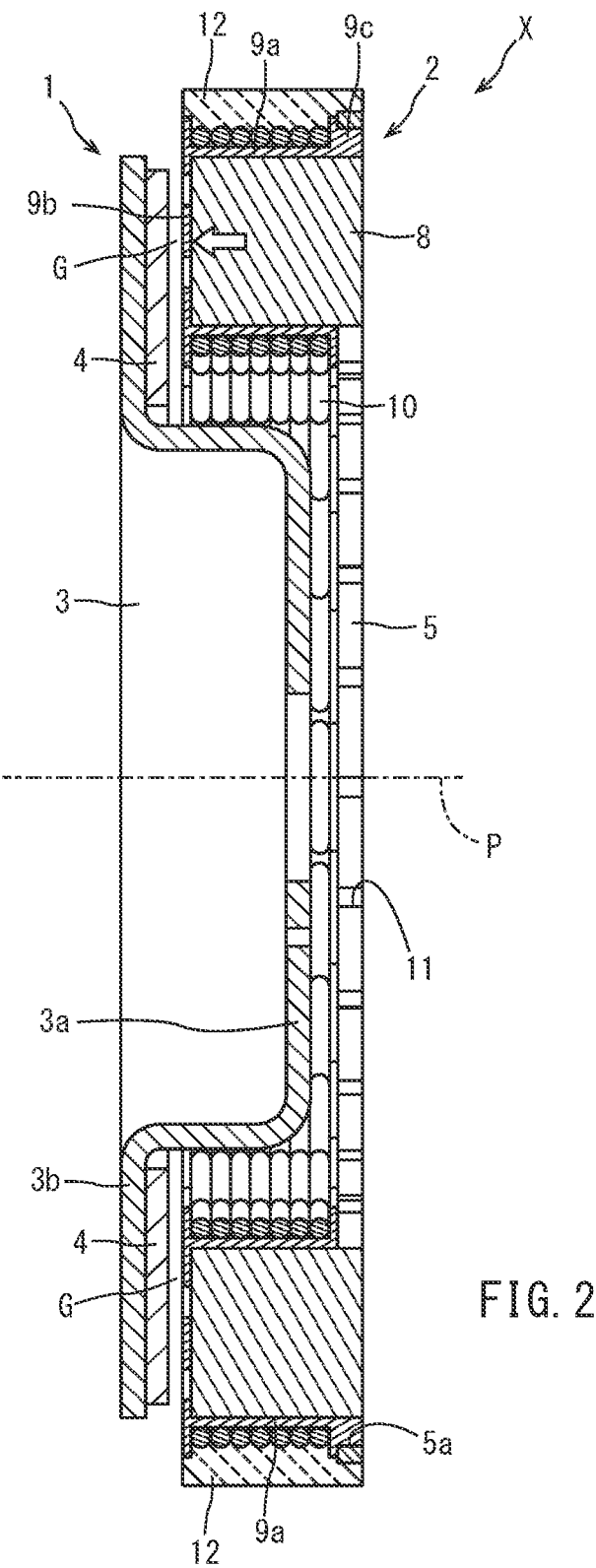
FIG. 2 is a cross-sectional view taken along line II-II in FIG. 1.

With reference to FIGS. 1 and 2, the axial-gap-dynamoelectric machine X according to a first embodiment will be described. FIG. 1 is a plan view illustrating a schematic configuration of the axial-gap-dynamoelectric machine X. FIG. 1 is a view in which the stator 2 of the axial-gap-dynamoelectric machine X is seen in the first direction. FIG. 2 is a cross-sectional view illustrating a cross section of the axial-gap-dynamoelectric machine X taken along line II-II in the radial directions.

As illustrated in FIG. 2, the axial-gap-dynamoelectric machine X according to this embodiment is, for example, a motor in which the rotor 1 and the stator 2 are arranged in the axial directions of the rotation axis P of the rotor 1, and the rotor 1 rotates about the rotation axis P. The axial-gap-dynamoelectric machine X may be an electric generator.

The axial-gap-dynamoelectric machine X includes the rotor 1 and the stator 2. The rotor 1 and the stator 2 are opposed to each other in the axial directions. The rotor 1 and the stator 2 are disposed to have a predetermined gap G in the axial directions.

The rotor 1 rotates about the rotation axis P with respect to the stator 2. The rotor 1 includes a rotor yoke 3 and a plurality of field magnets 4.

The rotor yoke 3 is, for example, a hat-shaped member constituted by a ferromagnet steel sheet. That is, the rotor yoke 3 includes a bottomed cylindrical rotor yoke projection 3a and an annular rotor yoke flange 3b disposed to surround the rotor yoke projection 3a.

An unillustrated rotor shaft penetrates the rotor yoke projection 3a. The rotor shaft is connected to the rotor yoke projection 3a. Accordingly, the rotor yoke 3 rotates integrally with the rotor shaft. A rotation axis of the rotor shaft coincides with the rotation axis P. A direction in which the rotor yoke projection 3a projects is the axis directions of the rotation axis P. The rotor yoke projection 3a and the rotor yoke flange 3b are integrally formed. In the axial-gap-dynamoelectric machine X, the rotor yoke projection 3a is located inward of the annular stator 2 described later in the radial directions.

The rotor yoke 3 may have a shape other than the hat shape, such as a disc shape or a cylindrical shape. The rotor yoke 3 may have any shape as long as the rotor yoke is rotatable together with the rotor shaft with field magnets 4 described later being held.

The field magnets 4 are rectangular flat-plate members. The field magnets 4 are fixed to the rotor yoke flange 3b. In this embodiment, the field magnets 4 are fixed on a surface of the rotor yoke flange 3b located in the projection direction of the rotor yoke projection 3a. On the rotor yoke flange 3b, the plurality of field magnets 4 are arranged at regular intervals along the circumferential direction. Accordingly, when the rotor 1 rotates about the rotation axis P, the field magnets 4 also rotate about the rotation axis P.

The field magnets 4 may be fixed to the rotor yoke flange 3b in any manner such as adhesion, screwing, welding, or deposition. The field magnets 4 may have other shapes such as a round shape, or a shape other than the plate shape, such as a rod shape.

The field magnets 4 generate magnetic fluxes in the thickness directions. That is, in this embodiment, the directions of magnetic fluxes generated by the field magnets 4 are axial directions of the rotation axis P in the rotor 1. The directions of magnetic fluxes generated by the field magnets 4 may be changed depending on the configuration of the dynamoelectric machine.

The stator 2 is configured to be cylindrical as a whole. The stator 2 and the rotor 1 are arranged in the axial directions of the rotation axis P such that the rotor yoke projection 3a is located inward of the stator 2 in the radial directions. The stator 2 includes a base yoke 5, a plurality of pressed powder teeth 8, resin bobbins 9, and stator coils 10. In the stator 2 of this embodiment, the base yoke 5 is a member separate from the plurality of pressed powder teeth 8.

Figure 3:
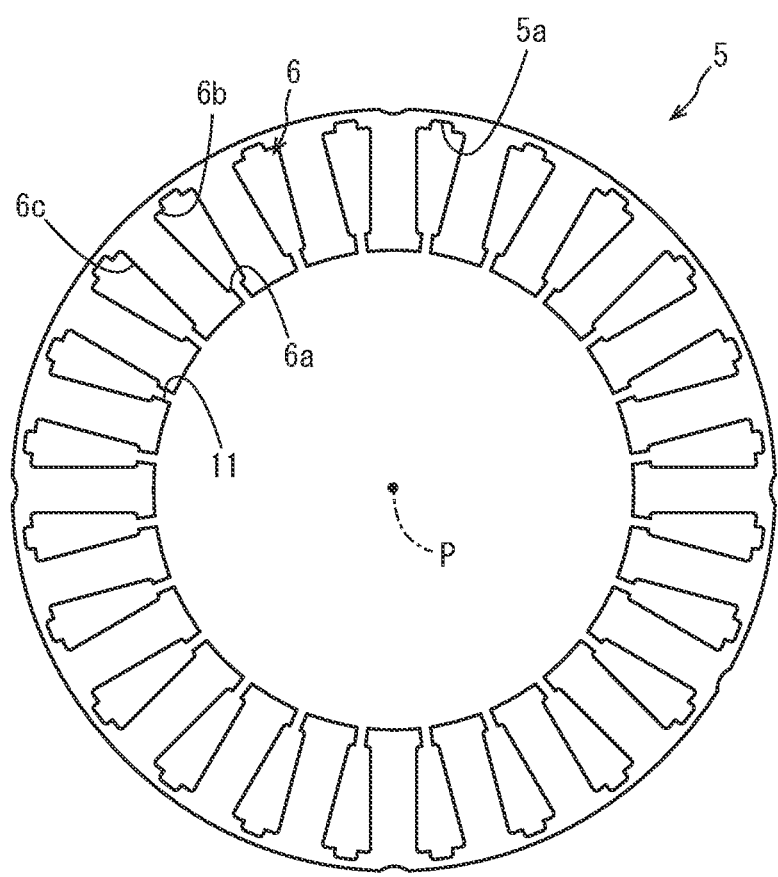
FIG. 3 is a view illustrating a schematic configuration of a base yoke.

With reference to FIG. 3, the base yoke 5 constituting the axial-gap-dynamoelectric machine X according to the first embodiment will be described. FIG. 3 is a plan view illustrating a schematic configuration of the base yoke 5. The base yoke 5 is constituted by, for example, an annular plate-shaped magnetic material such as an electromagnetic steel sheet. The base yoke 5 may be configured by laminating electromagnetic steel sheets in the thickness direction or may be made of pressed powder or an amorphous material, for example, as long as the base yoke 5 is a magnetic material.

The base yoke 5 includes a plurality of tooth holes 6 as a plurality of insertion holes arranged in the circumferential direction. In this embodiment, the base yoke 5 includes the same number of tooth holes 6 as the number of slots T each of which is a groove between adjacent teeth. The pressed powder teeth 8 described later are individually inserted in the plurality of tooth holes 6.

The tooth holes 6 extend in the radial directions of the base yoke 5 when the base yoke 5 is seen along the axial directions. When the base yoke 5 is seen along the axial directions, each of the tooth holes 6 includes a tooth-hole-radial-direction-outer-end surface 6b that is an end surface of the base yoke 5 located at the outer end of the tooth hole 6 in the radial directions, a tooth-hole-radial-direction-inner-end surface 6a that is an end surface of the base yoke 5 located at the inner end in the radial directions, a tooth-hole-circumferential-direction-end surface 6c constituting an oblique side connecting the tooth-hole-radial-direction-outer-end surface 6b and the tooth-hole-radial-direction-inner-end surface 6a. When the base yoke 5 is seen along the axial directions, in each of the tooth holes 6, the circumferential length of the tooth-hole-radial-direction-outer-end surface 6b is larger than the circumferential length of the tooth-hole-radial-direction-inner-end surface 6a. That is, each tooth hole 6 has a trapezoidal shape whose width in the circumferential direction increases toward the outer side of the base yoke 5 in the radial direction when the base yoke 5 is seen along the axial directions.

The tooth-hole-radial-direction-inner-end surface 6a of each tooth hole 6 has a slit 11. Accordingly, the tooth hole 6 is open to the inside of the base yoke 5. The width of each slit 11 along the circumferential direction is smaller than the circumferential length of the tooth-hole-radial-direction-inner-end surface 6a of the tooth hole 6. In the base yoke 5, the slits 11 can shut-off an eddy current occurring around the pressed powder teeth 8.

The base yoke 5 includes a plurality of positioning holes 5a arranged along the circumferential direction. Positioning protrusions 9c of the resin bobbins 9 described later are inserted in the plurality of positioning holes 5a. The base yoke 5 has the same number of positioning holes 5a as the number of tooth holes 6. The positioning holes 5a are located outward of the tooth holes 6 in the radial directions. That is, in the state where the pressed powder teeth 8 are inserted in the tooth holes 6, the positioning holes 5*a* are located outward of the pressed powder teeth 8 in the radial directions.

In this embodiment, the base yoke 5 includes the positioning holes 5*a* as rectangular notches that are open toward the outside of the base yoke 5 in the radial directions and are formed in the tooth-hole-radial-direction-outer-end surfaces 6*b* of the tooth holes 6. The rectangular notches as the positioning holes 5*a* are located to be continuous to at least a part of the tooth-hole-radial-direction-outer-end surfaces 6*b*.

Figure 4A:
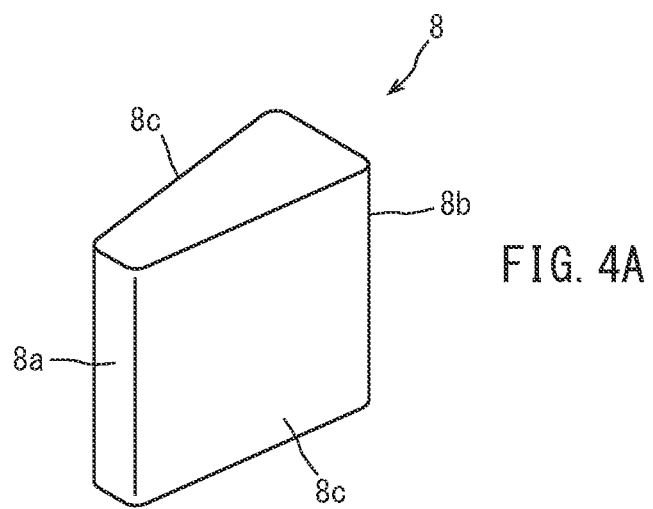
FIG. 4A is a perspective view illustrating a schematic configuration of a pressed powder tooth.
Figure 4B:
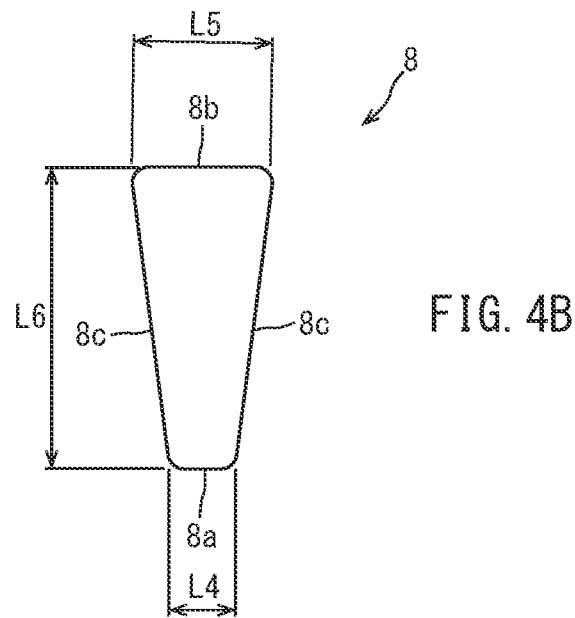
FIG. 4B is a view of the pressed powder tooth seen along an axial direction.

With reference to FIGS. 4A and 4B, the pressed powder teeth 8 constituting the axial-gap-dynamoelectric machine X according to the first embodiment will be described. FIG. 4A is a perspective view illustrating a schematic configuration of the pressed powder teeth 8. FIG. 4B is a view of the pressed powder teeth 8 seen along the axial directions. The pressed powder teeth 8 are constituted by particulates including particles of a magnetic material. Specifically, the pressed powder teeth 8 are constituted by pressed particles formed by integrally molding particulates under a predetermined pressure with a molding die. The pressed powder teeth 8 are arranged along the circumferential direction about the rotation axis P with respect to the base yoke 5. A cylindrical part including the pressed powder teeth 8 arranged along the circumferential direction about the rotation axis P with respect to the base yoke 5 will be referred to as the stator core 7.

The cylindrical stator core 7 includes slots T each located between adjacent ones of the pressed powder teeth 8. The stator coils 10 wound around the pressed powder teeth 8 are housed in the slots T. In this embodiment, as indicated by a broken line in FIG. 1, each of the slots T is rectangular when the stator 2 is seen along the axial directions of the rotation axis P. Although FIG. 1 shows one slot 37, the rectangular slot T is formed between each adjacent ones of the pressed powder teeth 8.

When seen along the axial directions, each of the pressed powder teeth 8 is a columnar member which extends along the radial directions and in which the circumferential length of the tooth-radial-direction-outer-end portion located at the outer end in the radial directions in the pressed powder tooth 8 is larger than the circumferential length of the tooth-radial-direction-inner-end portion located at the inner end in the radial direction in the pressed powder tooth 8. That is, the pressed powder teeth 8 are columnar members having substantially trapezoidal cross sections. Each of the pressed powder teeth 8 includes a pressed-powder-tooth-bottom surface 8*a* that is a surface of the tooth-radial-direction-inner-end portion constituting a shorter side of the cross section, a pressed-powder-tooth-upper surface 8*b* that is a surface of the tooth-radial-direction-outer-end portion constituting a longer side of the cross section, and a pressed-powder-tooth-oblique surface 8*c* that is the tooth-circumferential-direction-end portion constituting an oblique side connecting the pressed-powder-tooth-bottom surface 8*a* and the pressed-powder-tooth-upper surface 8*b* in the cross section. The cross-sectional shape and the cross-sectional area of the pressed powder teeth 8 are the same in the axial directions.

In each of the columnar pressed powder teeth 8, at least one of a longitudinal dimension or a transverse dimension of the cross section may gradually decrease in the axial direction. That is, each of the pressed powder teeth 8 may have a draft angle in the axial directions.

Figure 5:
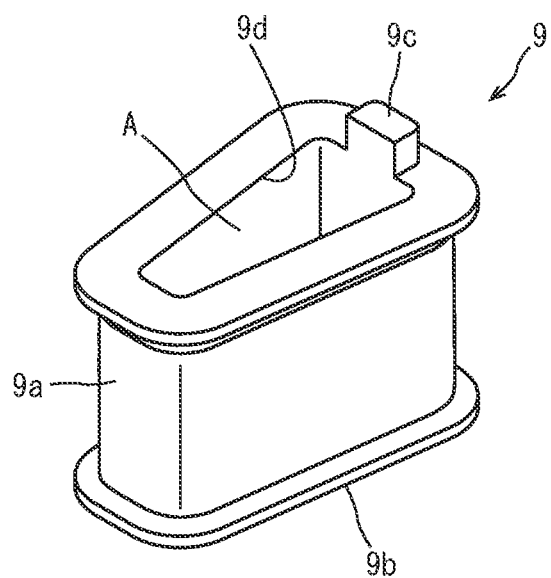
FIG. 5 is a perspective view illustrating a schematic configuration of a resin bobbin.
Figure 6:
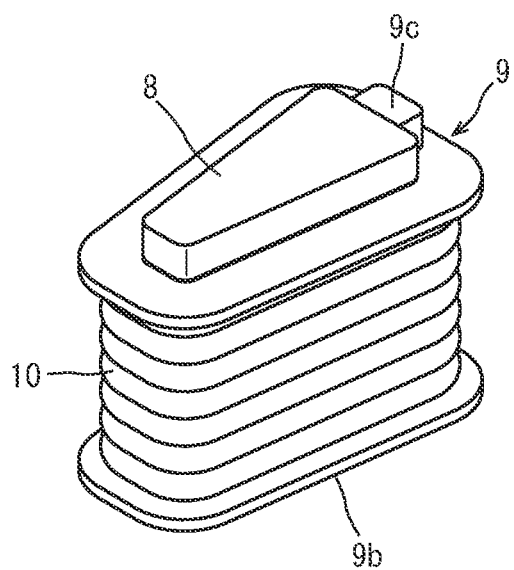
FIG. 6 is a perspective view illustrating a state where a pressed powder tooth is inserted in the resin bobbin and a stator coil is wound.

With reference to FIGS. 5 and 6, the resin bobbin 9 constituting the axial-gap-dynamoelectric machine X according to the first embodiment will be described. FIG. 5 is a perspective view illustrating a schematic configuration of the resin bobbin 9. FIG. 6 is a perspective view illustrating a state where the pressed powder tooth 8 is inserted in the resin bobbin 9 and the stator coil 10 is wound. Each of the plurality of pressed powder teeth 8 is equipped with the resin bobbin 9 that is a cylindrical resin bobbin. The resin bobbin 9 may be fixed to the pressed powder tooth 8 in any manner such as adhesion, screwing, welding, or deposition. The resin bobbin 9 is a resin member, and covers the pressed powder tooth 8 to thereby electrically insulate the pressed powder tooth 8 from the stator coil 10. The resin bobbin 9 has a bottomed cylindrical shape that can house the pressed powder tooth 8. Specifically, the resin bobbin 9 includes a side surface 9*a*, a bottom surface 9*b*, and the positioning protrusion 9*c*. In this embodiment, the side surface 9*a*, the bottom surface 9*b*, and the positioning protrusion 9*c* are integrally formed.

The side surface 9*a* is configured to define a pressed-powder-tooth-housing space A having a trapezoidal cross-sectional shape and capable of housing the pressed powder tooth 8 having a trapezoidal cross-sectional shape. The bottom surface 9*b* is located at one side of the resin bobbin 9 in the axial directions of a cylinder axis with respect to the side surface 9*a*, and defines one side of the pressed-powder-tooth-housing space A in the axial directions. The other side of the pressed-powder-tooth-housing space A in the axial directions is constituted by an opening 9*d* surrounded by the side surface 9*a* of the resin bobbin 9. The axial directions coincide with the axial directions of the rotation axis P in the axial-gap-dynamoelectric machine X.

The length of the pressed-powder-tooth-housing space A along the axial directions is smaller than the length of the pressed powder tooth 8 along the axial directions. Thus, in the state where the pressed powder tooth 8 is housed in the pressed-powder-tooth-housing space A, the pressed powder tooth 8 projects with respect to the side surface 34*a* in the axial direction.

The positioning protrusion 9*c* is a projection that extends from the opening 9*d* in the axial direction. The positioning protrusion 9*c* can be inserted in the positioning hole 5*a* of the base yoke 5.

Figure 7:
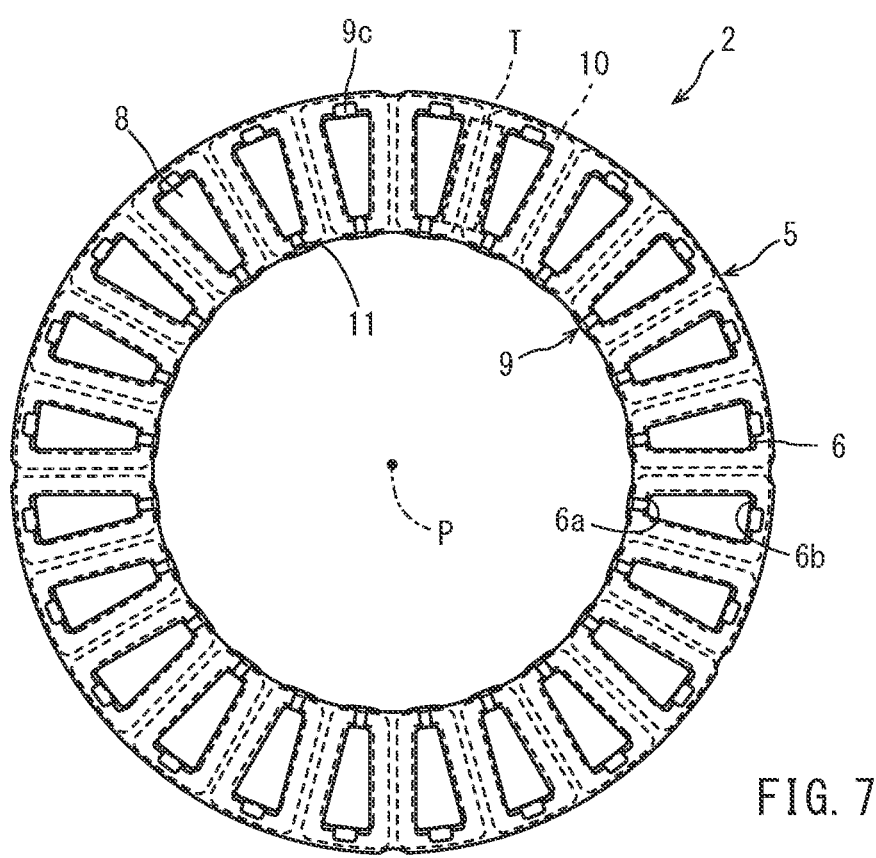
FIG. 7 is a view in which a state where the resin bobbins housing the pressed powder teeth are attached to the base yoke is seen in the first direction.
Figure 8:
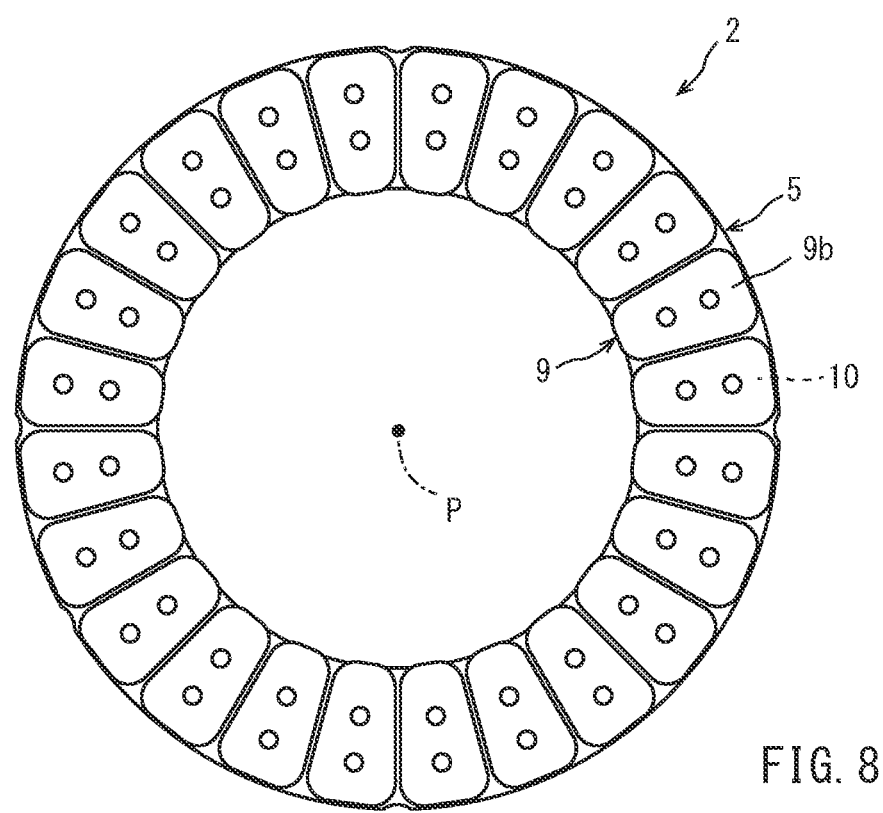
FIG. 8 is a view in which a state where the resin bobbins housing the pressed powder teeth are attached to the base yoke is seen in a second direction.

With reference to FIG. 7, the stator 2 constituting the axial-gap-dynamoelectric machine X according to the first embodiment will be described. FIG. 7 is a view in which a state where the resin bobbins 9 housing the pressed powder teeth 8 are attached to the base yoke 5 is seen in the first direction. FIG. 8 is a view in which the state where the resin bobbins 9 housing the pressed powder teeth 8 are attached to the base yoke 5 is seen in the second direction. As illustrated in FIG. 6, the pressed powder tooth 8 is inserted in the pressed-powder-tooth-housing space A of the resin bobbin 9 so that the pressed powder tooth 8 is covered with the resin bobbin 9.

The resin bobbins 9 housing the pressed powder teeth 8 are disposed with respect to the base yoke 5 such that the openings 9*d* of the side surfaces 9*a* are in contact with the base yoke 5. The bottom surfaces 9*b* of the resin bobbins 9 are disposed to face the rotor yoke 3. At this time, portions of the pressed powder teeth 8 projecting outward from the resin bobbins 9 are inserted in the tooth holes 6 of the base yoke 5. The pressed powder teeth 8 inserted in the tooth holes 6 project from the base yoke 5 toward the rotor yoke 3. Portions of the pressed powder teeth 8 projecting from the base yoke 5 are housed in the side surfaces 9*a*. End surfaces close to the rotor yoke 3 in the axial-direction-end surfaces located in the axial direction of the pressed powder teeth 8 are covered with the bottom surfaces 9b. The positioning protrusions 9c of the resin bobbins 9 are inserted in the positioning holes 5a of the base yoke 5. Accordingly, movement of the pressed powder teeth 8 in the rotor yoke direction is restricted by the bottom surfaces 9b, and the pressed powder teeth 8 are positioned with respect to the base yoke 5 by the positioning protrusions 9c.

A copper wire, for example, as a conductive material is wound on the side surface 9a of the resin bobbin 9. The copper wire, for example, constitutes the stator coil 10.

Figure 12:
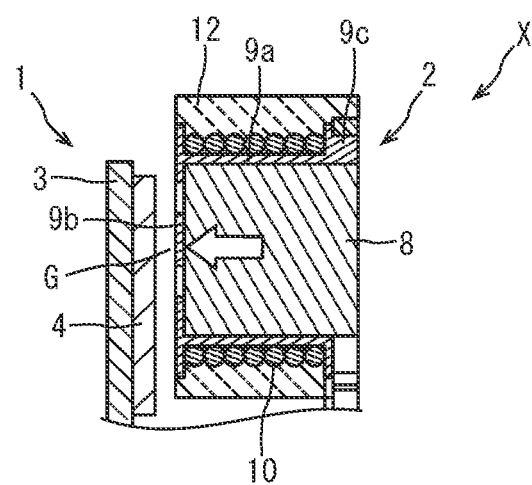
FIG. 12 is a partial cross-sectional view illustrating a positional relationship among a field magnet of a rotor, a resin bobbin, and a pressed powder tooth.

The stator 2 having the configuration described above is resin-molded by insert molding using a resin 12 (see FIG. 12). In the stator 2, the base yoke 5 and the pressed powder teeth 8 equipped with the stator coils 10 and the resin bobbins 9 are integrally molded with the resin 12. Accordingly, in the stator 2, the pressed powder teeth 8, the resin bobbins 9, and the stator coils 10 are fixed to the base yoke 5. The base yoke 5, the pressed powder teeth 8, and the stator coils 10 are insulated by the resin 12.

The stator 2 is sealed with the resin 12 in a state where the pressed powder teeth 8 are inserted in the tooth holes 6 in the base yoke 5 of the stator 2 so that it is possible to suppress occurrence of stress concentration on the base yoke 5 and the pressed powder teeth 8 to a reaction force occurring in the axial-gap-dynamoelectric machine X. Accordingly, sufficient strength of the fragile pressed powder teeth 8 can be obtained.

In the stator 2 of the thus-configured axial-gap-dynamoelectric machine X, the rotor 1 rotates with respect to the stator 2 by using attraction and repulsion generated by a magnetic field caused in the pressed powder teeth 8 by a current flowing in the stator coils 10 and a magnetic field caused by the field magnets 4 of the rotor 1.

(Pressed-Powder-Tooth Shape)

Figure 9:
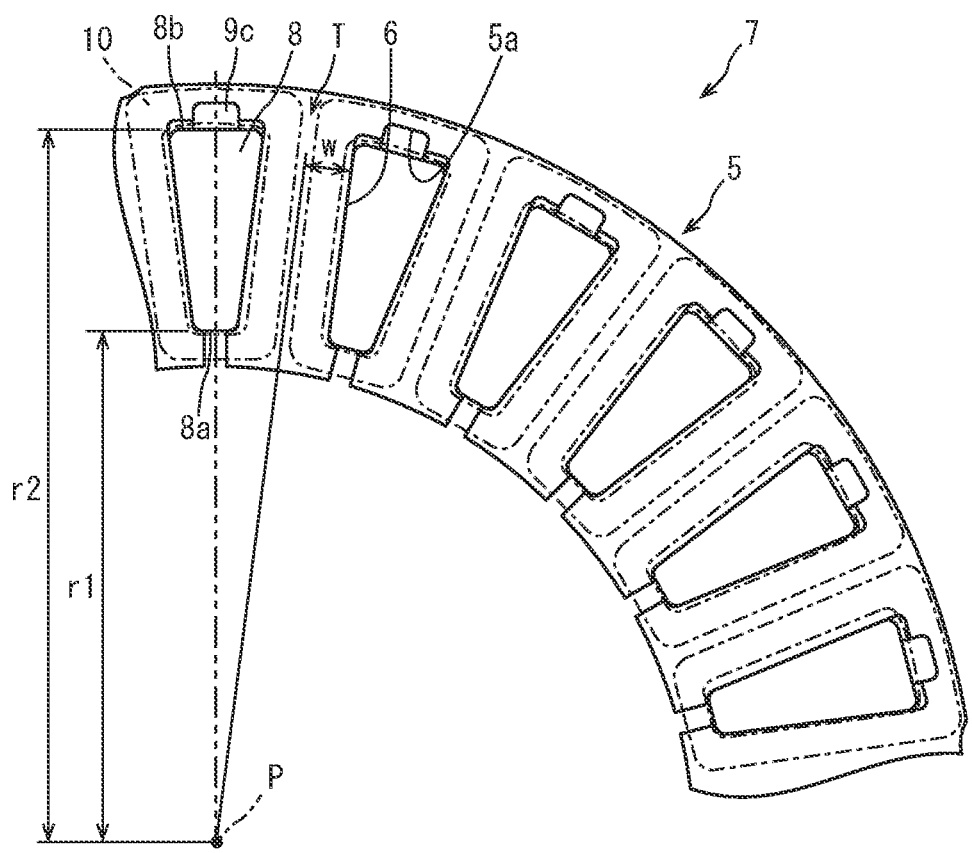
FIG. 9 schematically illustrates a positional relationship between pressed powder teeth adjacent to each other in a circumferential direction.

With reference to FIG. 9, a positional relationship among the plurality of pressed powder teeth 8 constituting the axial-gap-dynamoelectric machine X according to the first embodiment will be described. FIG. 9 schematically illustrates a positional relationship between the pressed powder teeth 8 adjacent to each other in the circumferential direction. In the axial-gap-dynamoelectric machine X having the configuration described above, slots T that are substantially rectangular when seen along the axial directions are formed between the pressed powder teeth 8 adjacent to each other in the circumferential direction of the base yoke 5. The stator coils 10 wound around the pressed powder teeth 8 with the resin bobbins 9 interposed therebetween are housed in the slots T.

The space factor of the stator coils 10 to the slots T increases by increasing intervals of the pressed-powder-tooth-bottom surface 8a smallest among intervals of the adjacent pressed powder teeth 8. That is, since the pressed powder teeth 8 have substantially trapezoidal shapes when seen along the axial directions in each of which the circumferential length of the pressed-powder-tooth-bottom surface 8a is smaller than the circumferential length of the pressed-powder-tooth-upper surface 8b, the space factor of the stator coil 10 in the slot T is larger than that in the case of using pressed powder teeth having substantially rectangular shapes when seen along the axial directions in each of which the circumferential length of the pressed-powder-tooth-bottom surface 8a is equal to the circumferential length of the pressed-powder-tooth-upper surface 8b.

In the axial-gap-dynamoelectric machine X having the configuration described above, each of the pressed powder teeth 8 may have a trapezoidal shape having the following dimensional relationship.

Supposing that
the number of slots of the stator core 7: S,
offset amount: w,
distance from the center of the stator core 7 (rotation axis P) to the pressed-powder-tooth-bottom surface 8a: r1, and
distance from the center of the stator core 7 (rotation axis P) to the pressed-powder-tooth-upper surface 8b: r2,
the pressed powder teeth 8 may have a trapezoidal shape defined below.

The dimensions described above are dimensions of the pressed powder teeth 8 schematically illustrated in FIG. 9.
core height: r1-r2
angle formed by an oblique side: $2\pi/S$
upper surface length: $2\times(r2-w/\sin(\pi/S))\times\tan(\pi/S)$
bottom surface length: $2\times(r1-w/\sin(\pi/S))\times\tan(\pi/S)$ The trapezoidal pressed powder teeth 8 satisfying the foregoing relationship are inserted in the tooth holes 6 of the base yoke 5 so that the pressed-powder-tooth-oblique surfaces 8c of the pressed powder teeth 8 adjacent to each other in the circumferential direction are parallel. Accordingly, the slot T can be obtained between the pressed-powder-tooth-oblique surfaces 8c adjacent to each other in the circumferential direction.

The expression "parallel" includes not only a case where the pressed-powder-tooth-oblique surfaces 8c of the adjacent pressed powder teeth 8 do not completely intersect with each other but also a case where an angle formed by the pressed-powder-tooth-oblique surfaces 8c of the adjacent pressed powder teeth 8 is less than 90 degrees.

With the configuration described above, the space factor of the stator coils 10 in the stator core 7 increases so that the number of windings of copper wires in the same cross-sectional area can be increased. Thus, magnetic flux density of the axial-gap-dynamoelectric machine X can be enhanced. In addition, as advantages of the increase in space factor of the stator coils 10, the size of the stator coils 10 can be increased, and square wires or edgewise wires can be wound as the stator coils 10. When the space factor of the stator coils 10 increases, an electrical resistance of the stator coils 10 can be reduced, and a copper loss, which is a cause of heat generation of the stator coils 10, can also be reduced.

With the configuration described above, although the diameter of wound wires needs to be large in order to uniformize the resistance of the stator coils 10, Al coils can also be wound. Accordingly, the weight of the axial-gap-dynamoelectric machine X can also be reduced by constituting coils by Al.

(Positioning of Pressed Powder Teeth 8 to Tooth Holes 6)

Figure 10:
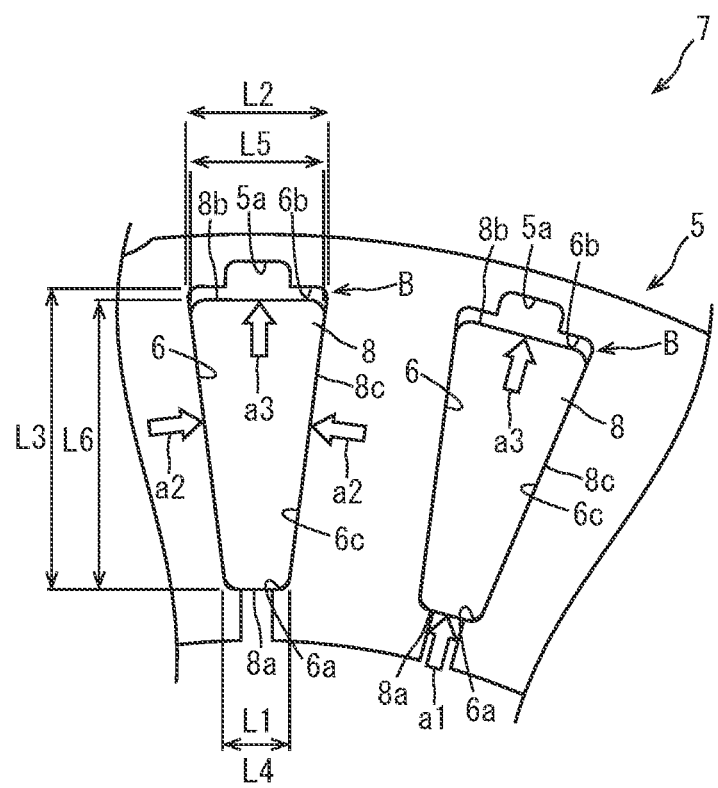
FIG. 10 is a view in which a state where pressed powder teeth are inserted in tooth holes is seen in the first direction.

Next, with reference to FIGS. 10 and 11, positioning of the pressed powder teeth 8 to be inserted in the tooth holes 6 will be described. FIG. 10 is a view in which a state where the pressed powder teeth 8 are inserted in the tooth holes 6 is seen in the first direction. The pressed powder teeth 8 are shaped to be insertable in the tooth holes 6 of the base yoke 5. Specifically, when each of the pressed powder teeth 8 is seen along the axial directions, an angle formed by one pressed-powder-tooth-oblique surface 8c and the other pressed-powder-tooth-oblique surface 8c in the pressed powder tooth 8 is substantially equal to an angle formed by one tooth-hole-circumferential-direction-end surface 6c and the other tooth-hole-circumferential-direction-end surface 6c in the tooth hole 6, when the base yoke 5 is seen along the axial directions. When each of the pressed powder teeth 8 is seen in the axial directions, the angle formed by one pressed-powder-tooth-oblique surface 8c and the other pressed-powder-tooth-oblique surface 8c in the pressed powder tooth 8 includes a margin with which the pressed powder tooth 8 can be inserted in the tooth hole 6.

When each of the pressed powder teeth 8 is seen along the axial directions, a circumferential length L4 of the pressed-powder-tooth-bottom surface 8a in the pressed powder tooth 8 is substantially equal to a circumferential length L1 of the tooth-hole-radial-direction-inner-end surface 6a in the tooth hole 6, when the stator core 7 is seen along the axial directions. The circumferential length L4 of the pressed-powder-tooth-bottom surface 8a includes a margin with which the pressed powder tooth 8 can be inserted in the tooth hole 6. On the other hand, when each of the pressed powder teeth 8 is seen along the axial directions, a circumferential length L5 of the pressed-powder-tooth-upper surface 8b in the pressed powder tooth 8 is smaller than a circumferential length L2 of the tooth-hole-radial-direction-outer-end surface 6b in the tooth hole 6, when the stator core 7 is seen along the axial directions. When each of the pressed powder teeth 8 is seen along the axial directions, a radial length L6 from the pressed-powder-tooth-bottom surface 8a to the pressed-powder-tooth-upper surface 8b in the pressed powder tooth 8 is smaller than a radial length L3 from the tooth-hole-radial-direction-inner-end surface 6a to the tooth-hole-radial-direction-outer-end surface 6b in the tooth hole 6, when the stator core 7 is seen along the axial directions.

In each of the pressed powder teeth 8, when the pressed-powder-tooth-oblique surface 8c is brought into contact with the tooth-hole-circumferential-direction-end surface 6c with the pressed powder tooth 8 inserted in the tooth hole 6, the pressed-powder-tooth-bottom surface 8a contacts the tooth-hole-radial-direction-inner-end surface 6a. At this time, the pressed-powder-tooth-upper surface 8b of the pressed powder tooth 8 does not contact the tooth-hole-radial-direction-outer-end surface 6b. That is, an interval B is present between the pressed-powder-tooth-upper surface 8b and the tooth-hole-radial-direction-outer-end surface 6b. Accordingly, the pressed powder teeth 8 are shaped not to be press fitted in the tooth holes 6.

In inserting the thus-configured pressed powder teeth 8 in the tooth holes 6, press fitting is unnecessary. With such a shape, in inserting the pressed powder teeth 8 in the tooth holes 6, a force applied to the pressed powder teeth 8 by contact between the pressed-powder-tooth-bottom surfaces 8a and the tooth-hole-radial-direction-inner-end surfaces 6a (see white arrow a1) or a force applied to the pressed powder teeth 8 by contact between the pressed-powder-tooth-oblique surface 8c and the tooth-hole-circumferential-direction-end surface 6c (see white arrow a2) is escaped outward along the radial directions (see white arrow a3). Accordingly, a contact pressure with the base yoke 5 in the pressed powder teeth 8 decreases. Thus, in inserting the pressed powder teeth 8 in the tooth holes 6, friction caused in the pressed powder teeth 8 by contact with the base yoke 5 is reduced. As a result, it is possible to provide the axial-gap-dynamoelectric machine X that allows magnetic fluxes to flow efficiently while enhancing assemblability of the pressed powder teeth 8 to the base yoke 5.

Figure 11:
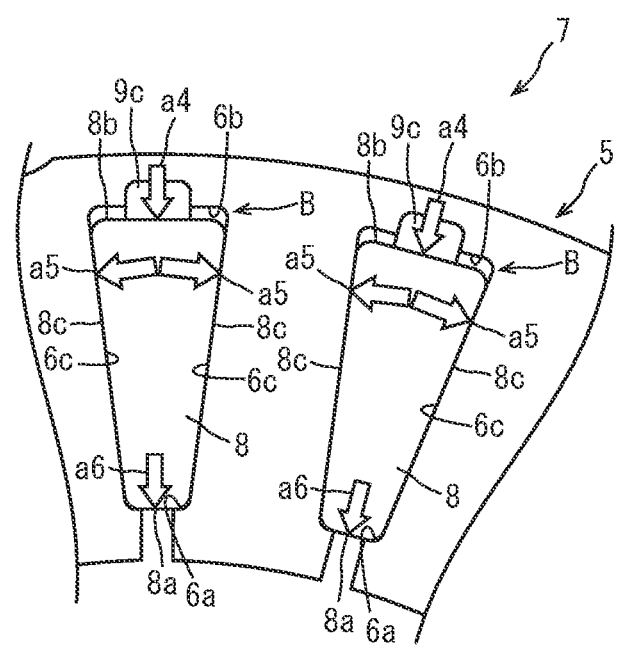
FIG. 11 is a view in which a state where positioning protrusions are inserted in positioning holes is seen in the first direction.

FIG. 11 is a view in which a state where the positioning protrusions 9c are inserted in the positioning holes 5a is seen in the first direction. The positioning protrusions 9c of the resin bobbins 9 attached to the pressed powder teeth 8 are configured to be inserted in the positioning holes 5a of the base yoke 5 in the state where the pressed powder teeth 8 are inserted in the tooth holes 6. In the state where the positioning protrusions 9c are inserted in the positioning holes 5a, each of the positioning protrusions 9c is located between the tooth-hole-radial-direction-outer-end surface 6b and the pressed-powder-tooth-upper surface 8b. At this time, the positioning protrusion 9c are press fitted between the tooth-hole-radial-direction-outer-end surface 6b and the pressed-powder-tooth-upper surface 8b. The pressed powder teeth 8 are subjected to a force inward in the radial directions (see while arrow a4) by an elastic force of the press-fitted positioning protrusions 9c. Accordingly, the pressed-powder-tooth-bottom surface 8a is brought into contact with the tooth-hole-radial-direction-inner-end surface 6a, and the pressed-powder-tooth-oblique surface 8c is brought into contact with the tooth-hole-circumferential-direction-end surface 6c. That is, the resin bobbins 9 are configured to press the pressed powder teeth 8 against the base yoke 5 inward in the radial directions of the stator core 7 in the state where the positioning protrusions 9c are inserted in the positioning holes 5a.

Each of the pressed powder teeth 8 has a wedge shape whose circumferential length gradually decreases toward the inside of the stator core 7 in the radial directions, when the pressed powder teeth 8 are seen along the axial directions. Similarly, the pressed-powder-tooth-bottom surface 8a of each tooth hole 6 has a wedge shape whose circumferential length gradually decreases toward the inside of the stator core, when the stator core 7 is seen along the axial directions. When the pressed-powder-tooth-oblique surface 8c is brought into contact with the tooth-hole-circumferential-direction-end surface 6c by a force toward the inside of the stator core 7 in the radial directions by the positioning protrusion 9c, the pressed-powder-tooth-oblique surface 8c is pressed against the tooth-hole-circumferential-direction-end surface 6c by a force perpendicular to the pressed-powder-tooth-oblique surface 8c. By the function of a wedge, an amplified force of pressing the pressed powder teeth 8 against the base yoke 5 toward the inside of the stator core 7 in the radial direction is exerted on the pressed-powder-tooth-oblique surface 8c.

In each of the thus-configured pressed powder teeth 8, the pressed-powder-tooth-bottom surface 8a is pressed against the tooth-hole-radial-direction-inner-end surface 6a (see while arrow a6) so that the pressed powder tooth 8 is positioned in the radial directions base on the pressed-powder-tooth-bottom surface 8a that is the inner side of the pressed powder teeth 8 along the radial directions. Each of the pressed powder teeth 8 is positioned along the circumferential direction thereof by pressing the pressed-powder-tooth-oblique surface 8c against the tooth-hole-circumferential-direction-end surface 6c (see while arrow a5). The pressed-powder-tooth-oblique surface 8c of each pressed powder tooth is pressed against the tooth-hole-circumferential-direction-end surface 6c by a force amplified by the function of a wedge (see while arrow a5). Accordingly, magnetic resistance between the pressed-powder-tooth-oblique surface 8c and the tooth-hole-circumferential-direction-end surface 6c is reduced. Thus, even if the pressed powder teeth 8 and the base yoke 5 are configured as different members, magnetic fluxes flow efficiently in the stator core 7.

In each of the pressed powder teeth 8, the interval B between the pressed-powder-tooth-upper surface 8b and the tooth-hole-radial-direction-outer-end surface 6b is enlarged by the positioning protrusion 9c. The interval between the pressed-powder-tooth-upper surface 8b and the tooth-hole-radial-direction-outer-end surface 6b is enlarged so as to be substantially equal to the radial length of the positioning protrusion 9c. Accordingly, the pressed-powder-tooth-upper surface 8b and the tooth-hole-radial-direction-outer-end surface 6b do not contact because of interposition of the positioning protrusion 9c. In the stator core 7, the positioning protrusions 9c inhibit a flow of magnetic fluxes from the pressed powder teeth 8 to the outside of the base yoke 5 in the radial direction. However, magnetic fluxes flowing from the pressed powder teeth 8 to the outside of the base yoke 5 in the radial direction are sufficiently small relative to all the magnetic fluxes flowing from the pressed powder teeth 8 to the base yoke 5, and thus, do not significantly affect the entire magnetic fluxes. Since the positioning protrusions 9c are located outward or inward of the tooth holes 6 in the radial directions, the positioning protrusions 9c do not inhibit a flow of magnetic fluxes from the pressed powder teeth 8 to the base yoke 5 along the circumferential direction. As a result, it is possible to provide the axial-gap-dynamoelectric machine X that allows magnetic fluxes to flow efficiently while enhancing assemblability of the pressed powder teeth 8 to the base yoke 5.

(Positioning of Pressed Powder Teeth 8 by Resin Bobbins 9)

Next, with reference to FIG. 12, positioning of the pressed powder teeth 8 in the direction of the rotation axis P by the resin bobbins 9 will be described. FIG. 12 is a partial cross-sectional view illustrating a positional relationship among the field magnet 4 of the rotor 1, the resin bobbin 9, and the pressed powder tooth 8. The resin bobbin 9 attached to the pressed powder tooth 8 is positioned in the radial directions and the circumferential direction in the tooth hole 6 of the pressed powder tooth 8 in the body of the resin bobbin 9 by inserting the positioning protrusion 9c in the positioning hole 5a. The bottom surface 9b of the resin bobbin 9 attached to the pressed powder tooth 8 covers at least a part of an end surface of the pressed powder tooth 8 in the body of the resin bobbin 9, the end surface of the pressed powder tooth being near the rotor yoke 3.

In the axial-gap-dynamoelectric machine X, the bottom surfaces 9b face the field magnets 4 of the rotor 1 in the axial directions. That is, the bottom surfaces 9b are located between the field magnets 4 and the pressed powder teeth 8. Thus, even when the pressed powder teeth 8 are subjected to a magnetic suction force (see while arrow) by the field magnets 4, the bottom surfaces 9b restrict movement of the pressed powder teeth 8 toward the rotor yoke 3. That is, the bottom surfaces 9b of the resin bobbins 9 prevent release of the pressed powder teeth 8 from the resin bobbins 9. The bottom surfaces 9b of the resin bobbins 9 maintain a uniform axial gap between the field magnets 4 and the pressed powder teeth 8. Accordingly, the resin bobbins 9 can restrict movement of the pressed powder teeth 8 in the radial directions and the circumferential direction of the rotor yoke 3 and movement of the pressed powder teeth 8 toward the rotor yoke 3 in the tooth holes 6.

(Positioning of Pressed Powder Teeth 8 by Molding)

Figure 13:
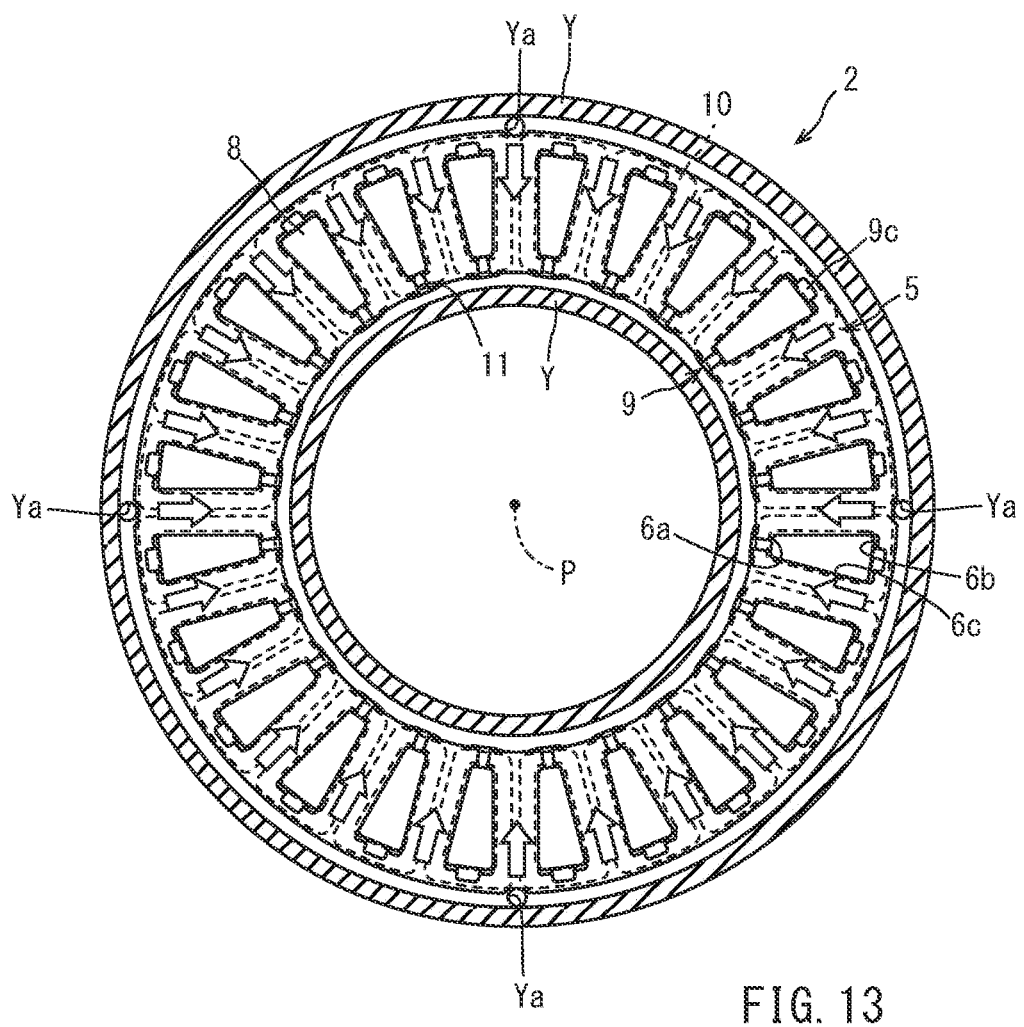
FIG. 13 is a view of a rotor disposed in a die for resin molding seen in the first direction.

Next, with reference to FIG. 13, positioning of the pressed powder teeth by using the resin 12 will be described. FIG. 13 is a view of the rotor 1 disposed in a die Y for resin molding, seen in the first direction. The stator 2 including the stator core 7 is molded with the resin 12 (see FIG. 12) in a state where the pressed powder teeth 8 equipped with the stator coils 10 and the resin bobbins 9 are inserted in the tooth holes 6 of the base yoke 5. The stator 2 is disposed in the molding die Y. The molding die Y has at least one injection port Ya for injecting the resin 12 in the molding die Y, and the injection port Ya is located outside the pressed powder teeth 8 along the radial directions. The resin 12 injected from the injection port Ya into the molding die Y flows inward along the radial directions of the stator 2 (see while arrows). With a pressure of a flow of the resin 12, the pressed powder teeth 8 in the tooth holes 6 are pressed against the base yoke 5 inward along the radial directions of the stator 2. The stator 2 is molded by solidification of the resin 12 in a flow state with which the molding die Y is filled. The pressed powder teeth 8 are molded with the resin 12 while being pressed against the base yoke 5. Accordingly, in the stator 2, the pressed-powder-tooth-bottom surfaces 8a of the pressed powder teeth 8 are not separated from the tooth-hole-circumferential-direction-end surfaces 6c of the base yoke 5 by a pressure caused by a flow of the resin 12 injected into the molding die Y. As a result, it is possible to provide the axial-gap-dynamoelectric machine X that allows magnetic fluxes to flow efficiently while enhancing assemblability of the pressed powder teeth 8 to the base yoke 5.

In addition, the stator 2 is molded with the resin 12 with the pressed powder teeth 8 inserted in the tooth holes 6 of the base yoke 5 so that it is possible to suppress occurrence of stress concentration on the base yoke 5 and the pressed powder teeth 8 caused due to a reaction force occurring in the axial-gap-dynamoelectric machine X. Accordingly, sufficient strength of the fragile pressed powder teeth 8 can be obtained.

Other Embodiments

The embodiment of the present teaching has been described above, but the embodiments are merely examples for carrying out the present teaching. Thus, the present teaching is not limited to the embodiment described above, and the embodiment may be modified as necessary within a range not departing from the gist of the present teaching.

In the embodiment, the positioning holes 5a are located outward of the tooth holes 6 along the radial directions of the base yoke 5. Alternatively, the positioning holes may be located inward of the tooth holes along the radial directions of the base yoke. The positioning holes may be located along the circumferential direction of the tooth holes.

In the embodiment, each of the resin bobbins 9 has the positioning protrusion 9c near the longer side of the opening 9d when the side surface 9a is seen from the opening 9d. Alternatively, the positioning protrusion 9c of each resin bobbin 9 may be located near the shorter side of the opening 9d when the side surface 9a is seen from the opening 9d, depending on the position of the positioning hole 5a.

In the embodiment, the base yoke 5 has the positioning holes 5a as notches continuous to at least a part of the tooth-hole-radial-direction-outer-end surfaces 6b constituting the tooth holes 6. Alternatively, the base yoke may have positioning holes with dependent shapes not continuous to the tooth-hole-radial-direction-outer-end surfaces. The base yoke may have, for example, holes not continuous to a part of the tooth holes or notches continuous to the outer-peripheral-end surface of the base yoke as positioning holes.

In the embodiment, the pressed powder teeth 8 are columnar members having substantially trapezoidal cross sections. Alternatively, the pressed powder teeth may be columnar members having another cross-sectional shape. Corner portions of the pressed powder teeth may have rounded portions or chamfered portions, for example.

In the embodiment, the tooth holes 6 include the positioning holes 5a and the slits 11. Alternatively, the tooth holes may not include at least one of the positioning holes or the slits.

In the embodiment, the resin bobbins 9 include the positioning protrusions 9c and the bottom surfaces 9b. Alternatively, the resin bobbins only need to be shaped to enable suppression of movement of the pressed powder teeth in the bodies of the resin bobbins toward the rotor yoke. Each resin bobbin may include a projection to be engaged with the pressed powder tooth at one end of the body of the resin bobbin.

In the embodiment, the positioning protrusions 9c projecting in the cylinder axis direction of the resin bobbins 9 are inserted in the positioning holes 5a that are notches in the base yoke 5. Alternatively, positioning hole portions that are projections of the base yoke may be inserted in positioning projection portions that are holes in the resin bobbin flanges of the resin bobbins. Positioning pins may be inserted in positioning protrusion portions that are holes in resin bobbin flanges of the resin bobbins and in positioning hole portions that are holes in the base yoke.

REFERENCE SIGNS LIST

X axial gap motor
1 rotor
2 stator
3 rotor yoke
3a rotor yoke projection
3b rotor yoke flange
4 field magnet
5 base yoke
5a positioning hole
6 tooth hole
6a tooth-hole-radial-direction-inner-end surface
6b tooth-hole-radial-direction-outer-end surface
6c tooth-hole-circumferential-direction-outer-end surface
7 stator core
8 pressed powder teeth (teeth)
8a pressed-powder-tooth-bottom surface (tooth-radial-direction-outer-end portion)
8b pressed-powder-tooth-upper surface (tooth-radial-direction-inner-end portion)
8c pressed-powder-tooth-oblique surface (tooth-circumferential-direction-end portion)
9 resin bobbin
9a side surface
9b bottom surface
9c positioning protrusion
9d opening
10 stator coil
11 slit
G gap
T slot
P rotation axis
A pressed-powder-tooth-housing space

The invention claimed is:

1. An axial-gap-dynamoelectric machine comprising:
a rotor rotatable about a rotation axis, the rotor including a plurality of field magnets arranged around the rotation axis;
a cylindrical stator core, aligned with the rotor in an axial direction of the stator core, such that the rotation axis of the rotor is in the axial direction, the stator core including
a base yoke, and
a plurality of teeth formed of pressed particles and arranged along a circumferential direction of the stator core around the base yoke;
a plurality of resin bobbins, respectively for the plurality of teeth to be individually inserted therein; and
a plurality of stator coils respectively wound around the plurality of resin bobbins, wherein
each of the plurality of resin bobbins includes
a side surface,
a bottom surface, and
a positioning protrusion protruding from the side surface in the axial direction of the stator core;
the base yoke includes
a plurality of tooth holes respectively for the plurality of teeth to be individually inserted therein, and
a plurality of positioning holes respectively located outward or inward of the plurality of tooth holes in a radial direction of the stator core, and configured for the plurality of positioning protrusions to be respectively inserted therein;
in a view of the stator core in the axial direction,
each of the plurality of tooth holes extends along the radial direction, and has
a tooth-hole-radial-direction-outer-end surface located at an outer end of said each tooth hole in the radial direction, and
a tooth-hole-radial-direction-inner-end surface located at an inner end of said each tooth hole in the radial direction,
a circumferential length of the tooth-hole-radial-direction-outer-end surface being larger than a circumferential length of the tooth-hole-radial-direction-inner-end surface, and
each of the plurality of teeth extends along the radial direction, and has a columnar shape including
a tooth-radial-direction-outer-end portion located at an outer end of said each tooth in the radial direction, and
a tooth-radial-direction-inner-end portion located at an inner end of said each tooth in the radial direction,
a circumferential length of the tooth-radial-direction-outer-end portion being larger than a circumferential length of the tooth-radial-direction-inner-end portion; and
in a state where the plurality of positioning protrusions is respectively inserted in the plurality of positioning holes, the plurality of positioning protrusions respectively press the plurality of teeth against the base yoke inward in the radial direction of the stator core, such that, for each of the plurality of teeth inserted in a corresponding one of the plurality of tooth holes,
the tooth-radial-direction-inner-end portion of said each tooth is in contact with the tooth-hole-radial-direction-inner-end surface of said corresponding one tooth hole,
a tooth-circumferential-direction-end portion located at an end of said each tooth in the circumferential direction of the stator core is in contact with a tooth-hole-circumferential-direction-end surface located at an end of said corresponding one tooth hole in the circumferential direction of the stator core, and
the tooth-radial-direction-outer-end portion of said each tooth is not in contact with the tooth-hole-radial-direction-outer-end surface of said corresponding one tooth hole.

2. The axial-gap-dynamoelectric machine according to claim 1, wherein
an inner surface of each of the positioning holes forms a continuous surface with at least a part of the tooth-hole-radial-direction-outer-end surface, or with at least a part of the tooth-hole-radial-direction-inner-end surface, of one of the tooth holes corresponding thereto.

3. The axial-gap-dynamoelectric machine according to claim 1, wherein
the plurality of positioning holes is located outward of the plurality of teeth in the radial direction of the stator core.

4. The axial-gap-dynamoelectric machine according to claim 3, wherein, for each of the plurality of teeth inserted in a corresponding one of the plurality of tooth holes,
an interval between the tooth-hole-radial-direction-outer-end surface of said corresponding one tooth hole and the tooth-radial-direction-outer-end portion of said each tooth is enlarged by inserting one of the positioning protrusions corresponding thereto in one of the positioning holes corresponding thereto.

5. The axial-gap-dynamoelectric machine according to claim 1, wherein
the stator core is molded with a resin flowing from outside to inside in the radial direction of the stator core.

6. The axial-gap-dynamoelectric machine according to claim 1, wherein
each of the plurality of tooth has a first axial-direction-end surface and a second axial-direction-end surface located respectively at a first end and a second end of said each tooth in the axial direction of the stator core, the first end being closer to the rotor than the second end, and
each of the plurality of resin bobbins covers at least a part of one of the first axial-direction-end surfaces.

\* \* \* \* \*